United States Patent [19]
Bromley et al.

[11] Patent Number: 5,214,843
[45] Date of Patent: Jun. 1, 1993

[54] APPARATUS FOR APPLYING TEE-NUT FASTENERS TO WORKPIECES

[76] Inventors: Keith G. Bromley, Brownlee Drive, Bradford; Walter H. Leistner, 97 Alamosa Drive, Toronto, both of Canada

[21] Appl. No.: 687,167

[22] Filed: Apr. 18, 1991

[30] Foreign Application Priority Data

Apr. 23, 1990 [CA] Canada ................................ 2015219

[51] Int. Cl.$^5$ .............................................. B23P 19/00
[52] U.S. Cl. ...................................... 29/798; 29/281.5
[58] Field of Search .............. 29/798, 771, 809, 281.5, 29/282; 227/154, 114, 16

[56] References Cited

U.S. PATENT DOCUMENTS

| | | | |
|---|---|---|---|
| 3,460,217 | 12/1969 | Leistner | |
| 3,556,743 | 1/1971 | Yeager | 29/809 |
| 3,810,290 | 5/1974 | Grube | 29/798 |
| 3,811,171 | 5/1974 | Grube | 29/798 |
| 4,224,731 | 9/1980 | Lingle | 29/798 |
| 4,821,940 | 4/1989 | Rotherham | |

FOREIGN PATENT DOCUMENTS 583977 11/1989 Australia .

Primary Examiner—P. W. Echols
Assistant Examiner—David P. Bryant

[57] ABSTRACT

Apparatus for setting fasteners in holes in a workpiece, and having an upper register device for engaging a workpiece on one side at a hole, a lower driver device operable to reciprocate to and fro towards and away from the workpiece on another side of the workpiece in registration with the register device and, a feed assembly to supply fasteners to the driver device, and a package of fasteners connected in a strip for such apparatus, and a method of setting such fasteners in a workpiece.

4 Claims, 7 Drawing Sheets

APPARATUS FOR APPLYING TEE-NUT FASTENERS TO WORKPIECES

FIELD OF THE INVENTION

The invention relates to fastener setting apparatus for setting threaded fasteners in a wooden workpiece, and to a strip of fasteners, and to a method of setting fasteners, and to a package of such fasteners for insertion by such a method.

BACKGROUND OF THE INVENTION

Threaded fastening devices or so-called Tee-nuts are widely used in the furniture industry for securing components of furniture together. Such nuts are formed of sheet metal, and incorporate a threaded sleeve or barrel, and an integral face flange, and spikes, which are embedded in the workpiece around a pre-drilled hole. They are used, for example, in the construction of beds, for securing legs to a bed frame, and other furniture items.

Various forms of apparatus have been devised for the power-operated setting of such fastening devices at a high rate of speed. One example of such a fastener setting apparatus is shown in U.S. Pat. No. 3,460,217.

The apparatus disclosed in that patent has operated satisfactorily for many years. In that apparatus, the wooden workpiece was first of all placed on a lower working surface. Tee-nuts were fed from a hopper down a curved ramp, to a power-operated setting plunger located above the workpiece. The tee-nut was held in registration with the bottom of the plunger, and when the plunger was operated downwardly the tee-nut was released, and the plunger struck the tee-nut forcing it downwardly into a hole in the workpiece. This principle of operation involved certain problems in design. For example, it was necessary to time the plunger stroke carefully. As a result, considerable care had to be exercised in the manufacture, and adjustment of the apparatus. If this was not achieved, then either the nut would fall before the plunger could catch up with it, or alternatively the plunger would strike the nut too soon before it was released.

Another problem in the design of such earlier machines was that they required the use of a hopper, and a relatively expensive feed mechanism, for feeding the loose nuts. These requirements added to the complexity and hence the expense of such earlier apparatus. These factors had, in turn, limited the scope of the sales of such machines. In practice, they were economical only for relatively large scale manufacturing facilities.

A further proposal is shown in U.S. Pat. No. 4,821,940, granted to Allan C. Rotherham entitled T-nut Insertion Machine.

In this machine, a hopper and feed mechanism generally similar to that shown in earlier T-nut insertion machines, was used. However, in this machine, the T-nuts were fed to a feed mechanism from which they were delivered one at a time to a plunger. The plunger in this case operated with an upward insertion stroke, so that the T-nut was forced upwardly into the workpiece.

Above the workpiece, a stationary anvil or support was located against which the workpiece was held, while the T-nut was forced upwardly. In this device, however, the T-nuts were simply placed loose in the hopper as in the earlier devices, and as a result, it was necessary to provide for a two position delivery system for delivering the T-nuts to the plunger.

The T-nuts were thus delivered to a preliminary insertion location, at which point they stopped. The endmost T-nut was then moved over a ledge, one at a time, from the preliminary location, to the so called extended location, in which position it was then held ready for insertion by the plunger.

Clearly, if a machine could be designed at a much lower cost and, in particular, without the use of an expensive and complex hopper and feed mechanism, then the sales of such a machine could be made on a much larger scale, to a much greater range of customers.

Preferably, such a machine will operate on the method of upward insertion of fasteners, into a workpiece from below the work-piece, by moving each fastener upwardly, so as to produce significant advantages over earlier systems.

Preferably also, the invention will provide for a new and unique package of such fasteners arranged in a strip, for easy handling, and positioning in such an apparatus.

BRIEF SUMMARY OF THE INVENTION

With a view to overcoming the various disadvantages noted above the invention comprises apparatus for setting Tee-nut fasteners in a workpiece, said workpiece having holes formed therethrough for receiving said Tee-nut fasteners said Tee-nut fasteners including sleeve portions adapted to be embedded in said work piece, and the fasteners being formed and secured together into a continuous strip, and said apparatus in turn comprising upper register means for engaging a said workpiece on one side thereof at a said hole whereby to locate said workpiece in a predetermined location, lower driver means operable to reciprocate upwardly towards and downwardly away from said workpiece on another side of said workpiece opposite to said one side, and in registration with said register means, and, feed means operable to supply said strip of fasteners from a strip feed mechanism to said workpiece, whereby said fasteners are supplied one at a time under said workpiece to said driver means whereby operation of said driver means will drive said fasteners upwardly into said workpiece.

The invention further provides such an apparatus wherein said register means includes stop means for engaging said workpiece and securing same against movement in response to movement of said driver means.

The invention further provides such an apparatus wherein said storage means includes rotary support means for supporting said strip of fasteners and means for rotatably mounting said support means.

The invention further provides such an apparatus and wherein said feed guide channel means defines a delivery end adjacent said driver means, and further defines shoulders, defining a upwardly open narrow slot, of reduced width relative to said channel, and wherein said shoulders terminate short of said delivery end, whereby said endmost Tee-nut fastener is free of said shoulders, and can then be driven upwardly from said feed guide channel means by said driver means.

The invention further comprises such an apparatus and wherein said feed guide channel means defines a smooth continuous slide portion extending into said delivery end, whereby said fasteners in said strip can be fed smoothly therein without interruption.

The invention further provides apparatus for setting Tee-nut fasteners in a workpiece, said workpiece having holes formed therethrough for receiving said fasteners, said fasteners including sleeve portions adapted to be embedded in said work piece and integral face flanges extending from said sleeve portions substantially normal thereto and adapted to lie on a surface of said work piece said face flanges defining edges, and junction means secured to said fasteners whereby to form the same into a continuous strip and said strip being wound on drum means, from which they may be progressively unwound, and said apparatus comprising, register means for engaging a said workpiece on an upper side thereof at a said hole whereby to locate said workpiece in a predetermined location, driver means located beneath said register means and operable to reciprocate upwardly and downwardly towards and away from said workpiece on an under side of said workpiece opposite to said upper side, and in registration with said register means, drum means of generally cylindrical shape, and rotatable bearing means for supporting said drum means for rotation about a horizontal axis, and wherein said continuous strip is wound on said drum means, whereby the same may be fed rotatably off said drum means into said feed guide channel means, feed guide channel means secured to said apparatus, to receive said strip of fasteners from said drum means, said feed guide channel, defining a channel, whereby to receive said fasteners therein as they are unwound from said drum means, and said feed guide channel and deliver same to said driving means, and, incremental feed movement means operable to progressively unwind said strip of fasteners and to deliver said fastener strip along said feed guide channel and to supply the endmost fastener in said strip, one at a time, to said driver means whereby operation of said driver means will separate said endmost fastener from said strip and will drive said endmost fastener upwardly into said workpiece.

The invention also provides a drum type core carrying a strip of fasteners wound on such a drum.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 8 is a perspective of a coil of fasteners;

DESCRIPTION OF A SPECIFIC EMBODIMENT

Figure 1:
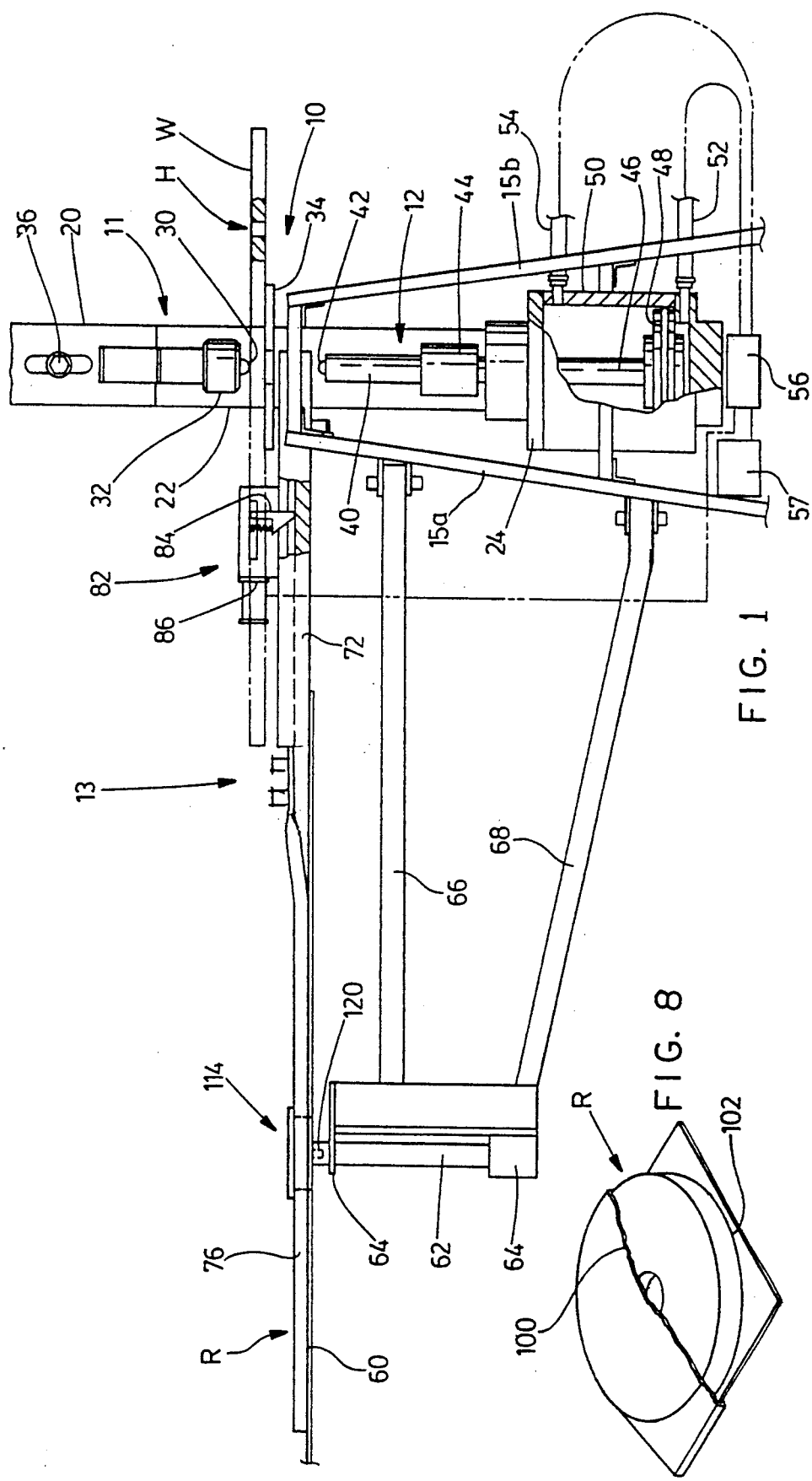
FIG. 1 is a front elevation of the apparatus according to the invention, shown partially cut away.

Referring first of all to FIG. 1, the setting apparatus in accordance with the invention is indicated by the general reference arrow 10. It will be seen to comprise a register assembly 11, a driving assembly 12, and a feed assembly 13. All three of the assemblies are supported together on a common stand consisting of four legs 15a, b, c, and d.

It will, of course, be appreciated however that if it was desired to incorporate the apparatus in an already existing production line, then it may be that the legs would be unnecessary, and their illustration here is merely by way of convenience of explanation, since clearly the apparatus could be supported on some other form of structure if desired.

Figure 6:
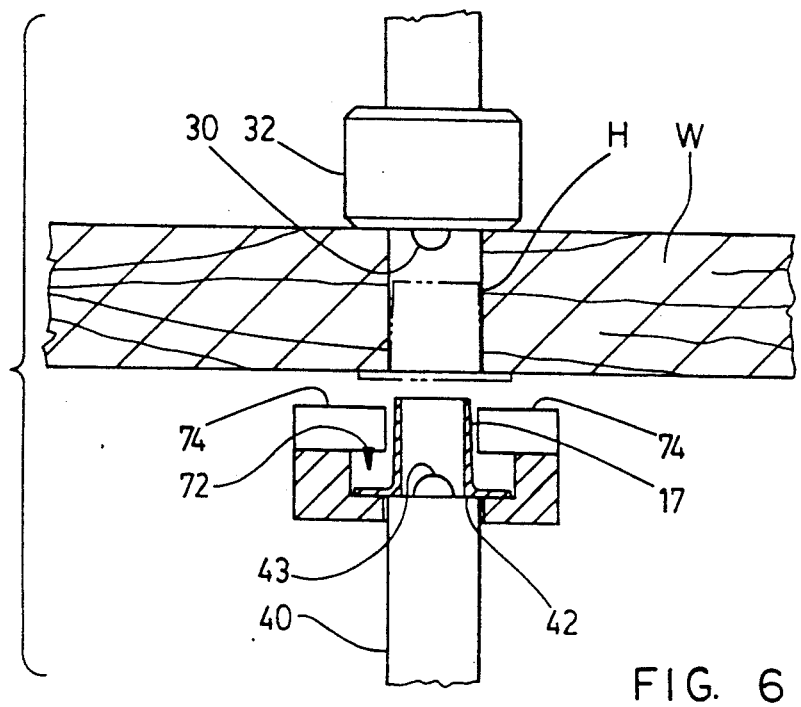
FIG. 6 is a section along line 6—6 of FIG. 7, showing the operation of the setting mechanism.
Figure 7:
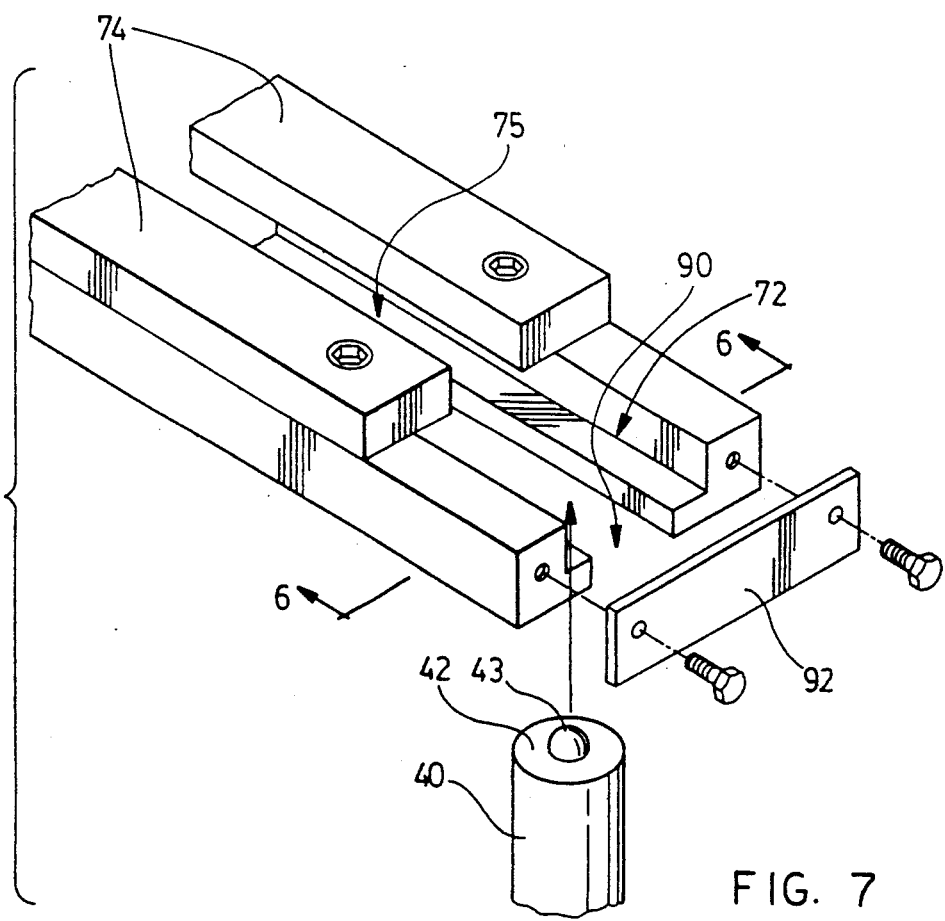
FIG. 7 is a cut-away perspective of the feed channel and drive piston.

Before describing the apparatus in detail, it will be appreciated that the nut setting apparatus is used for setting threaded fasteners known as Tee-nuts, in a wooden workpiece such as the frame of a bed for example. T-nuts are illustrated in FIG. 6 and 7 indicated generally as 16 and comprises a threaded collar or sleeve 17, and an integral face flange 18, and spikes or prongs 19. The wooden workpiece will already be pre-drilled, at the locations where the nuts are to be set, at a suitable drill apparatus located elsewhere in the plant, and requiring no description.

As will be described below, the T-nuts 16 are associated together in the form of a continuous strip by suitable strip forming means, in a manner to be described below and are then associated together in a relatively large coil indicated generally as C, as shown generally in FIGS. 8 and 9, described below.

Such a workpiece is indicated as W in FIG. 1 with, for example, three pre-drilled holes H, one being indicated in phantom.

The Register Assembly

The register assembly indicated generally as 11 comprises a generally C-shaped frame, comprising an upper horizontal portion 20, a rear vertical portion 22, and a lower horizontal portion 24. The frame is secured by any suitable means such as struts 26, to the legs 15.

Secured at the forward free end of the upper horizontal frame member 20 is a downwardly extending register pin 30, preferably having a tapered or rounded leading end for reasons to be described. The pin has a diameter equal to, or just less than the diameter of the holes H, pre-drilled in the workpiece W and has a length less than the length of such holes H. The holes H have a length which is equal to the thickness of the wooden workpiece W, since the holes H pass entirely through the workpiece.

At the upper end of the register pin, there is provided an annular anvil or ring 32, having a diameter which is typically in the region of the width of the workpiece W, although this dimension is not critical.

Located below, and on either side of the pin 30, is a rest plate 34, adapted to support the workpiece between operations, if necessary. Rest plate 34 defines an opening 36 therein for reasons to be described below.

Preferably, the register pin 30 and anvil 32 may be adjusted vertically, to accommodate workpieces of different thicknesses. Such an adjustment may be provided by means such as a threaded fastening 36, by means of which the register pin and anvil may be secured to the upper frame member.

The Driving Assembly

The driving assembly indicated generally as 12 will be seen to comprise a rod 40, having at its upper free end a hammer head 42, and a button 43. Rod 40 is secured by means of a releasable coupling 44, to a piston rod 46. Rod 46 is, in turn, connected to a piston 48, located in power cylinder 50.

Typically, cylinder 50 will be a pneumatic cylinder, operated by air pressure supplied by hoses 52 and 54.

Air pressure in hoses 52 and 54 are controlled by means of a control valve 56, in turn, controlled, for example, by a foot pedal 57.

The operation of the piston 48 in the cylinder 50 will cause the rod 40 to drive upwardly, and to return downwardly, in a manner described below.

The Feed Assembly

The feed assembly 13 is provided for feeding tee-nuts to the driving assembly. The feed assembly comprises a generally disk-like feed table 60, rotatably mounted on shaft 62. Shaft 62 is, in turn, supported, in suitable bearings 64, on the cantilever arms 66-68. Arms 66 and 68 are, in turn, secured in this embodiment to legs 15a-15c, so that the table 60 is supported to one side of the register assembly 11 and driving assembly 12.

A feed guide 70 connects between the surface of feed table 60, and a location beneath the rest plate 34, registering with rod 40. The feed guide 70 is secured to legs 15a and 15c, but is not secured to the table 60, so that the table 60 is free to rotate, while the guide 70 remains stationary.

A coil C of T-nuts 16 is shown located on the table 60, and the outer free end is shown extending through the feed guide 70. The feed guide 70 is arranged in the form of a support channel which is adapted to support the T-nuts "on edge" in the manner in which the strip S will unravel from the coil C. This ensures the smooth, regular, uncoiling or unravelling of the strip from the coil during operation.

Guide 70 in turn connects with a feed slide 72, of a predetermined width, and having shoulders 74—74, enclosing a portion of the channel and defining an upwardly open narrow slot 75 having a width less than said predetermined width of said slide.

A strip 76 of fasteners 16, comprising a plurality of individual fasteners 16—16 secured to junction means, in this case, a backing strip 80 (FIG. 4), formed into a coil C is supported on table 60, and is then fed from the table into the feed slide 72. Any suitable feed mechanism indicated generally as 82 and having, for example, a feed pawl 84 operated, for example, by a power-operated means such as a cylinder 86, may be operative to feed the strip 76 along the slide 72.

Figure 3:
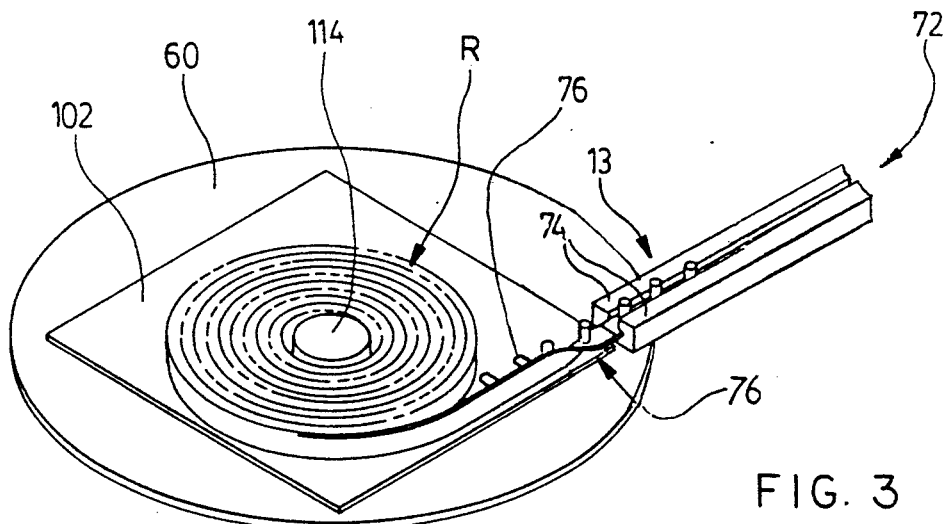
FIG. 3 is a perspective illustration of the feed table portion of the apparatus.

It will be noted from FIG. 3 that the coil 76 of fastener is positioned on the table 60, on edge and, in this way, the strip of fasteners can be freely unwound from the coil. However, as the end portion of the strip enters the slide 72, it twists through approximately 90 degrees, so that when the strip of fasteners is in the slide 72, they are lying with their threaded sleeve portions 17 extending upwardly through the narrow slot in 75.

At the point where the end of the slide 72 registers with the piston 40, the slide is provided with a downwardly open recess 90, of a sufficient width to admit the rod 40. Immediately above the recess 90, the shoulders 74—74 are removed, so that the end most fastener is then free of restraint from upward movement (FIGS. 6 and 7).

An end plate 92 closes the open end of slide 72. The slide 72 defines a smooth continuous surface along its length, to its end portion at the end plate 92. This facilitates the smooth intermittent feeding of Tee-nut fasteners 16 along the slide 72.

Preferably, the cylinder 86 of the feed mechanism is operated in timed relation to the operation of the piston 48. Such timed operation may be achieved by a separate valve and control, or may be achieved by connecting the valve 56 to the piston 86, so that the air exhausted from piston 48 after completion of its setting stroke, is then supplied to the cylinder 86 to provide a feed stroke. In this way, the feed mechanism will operate alternately with the setting mechanism, and provide a timed sequencing of movement of the strip along the channel.

In operation, an operator sets the coil of fasteners on the table 60 and feeds the strip of fasteners through guide 70 and along the feed slide 72 until the endmost fastener in the strip registers with the rod 40.

He will then place a wooden workpiece W on the table 34, and position it so that a hole H registers with the register pin 30. He will then simply raise the wooden workpiece with both hands, until the register pin 30 enters the hole. He will then operate the foot pedal 56, causing the piston 48 to be driven upwardly, and returned downwardly.

The button 43 on top 42 of the rod 40 will then register with the sleeve portion 17 of the endmost T-nut fastener 16, and the endmost fastener 16 will then be torn away from the strip, and driven forcefully upwardly into the hole H in the workpiece W. The spikes on the flange of the fastener 16 will be driven into the workpiece around the hole, and the flange will then impact on the surface of the workpiece.

The operator will then simply lower the workpiece from the register pin 30 and move it until the next hole registers and repeat the operation.

On each return stroke of the piston 48, air is vented via valve 56 to cylinder 86, thereby causing the strip to advance by an increment of one fastener.

It will thus be seen that the invention provides a simple setting apparatus for setting fasteners of this type, in which many of the problems inherent in earlier designs is overcome.

It will also be seen that the problem of handling, sorting, and feeding loose fasteners is overcome by the provision of a fastener strip, and by the provision of the rotating table 60, so that the fastener strips can simply be coiled on edge, and unwound and fed progressively to the setting apparatus.

It will thus be seen that the invention offers significant economies and significant improvements in operation over earlier types of apparatus.

Of particular significance is the fact that the speed of the piston 48 is relatively slow, when compared with the operation of earlier machines. This factor greatly reduces risks of malfunction and possible hazards in operation. In addition, it reduces noise, impact shock and the like, and thus reduces stress in the workplace.

Figure 4:
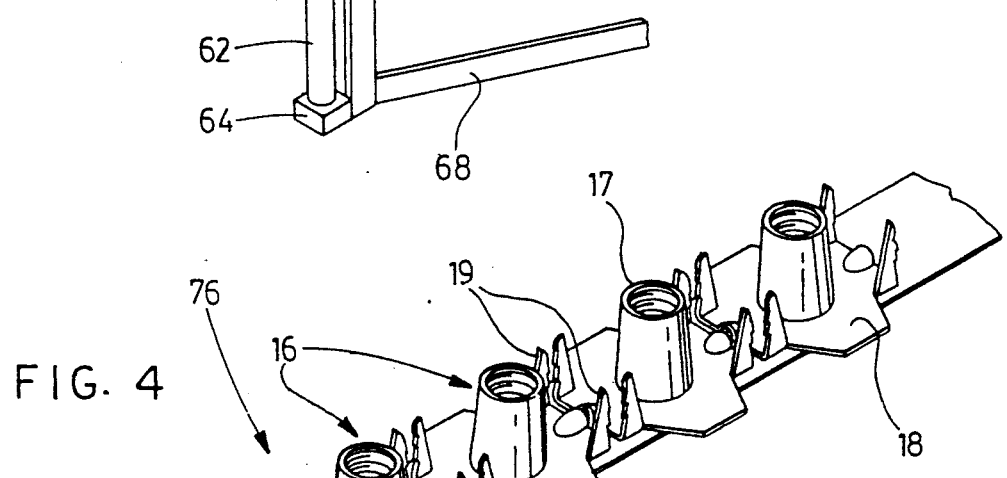
FIG. 4 is a perspective illustration of a strip of fasteners, in accordance with one embodiment of the invention.

The fastening strips illustrated in FIG. 4 consists of a series of fasteners 16 adhesively bonded to a backing strip 80 of paper, plastic, or the like. This has been found to be effective and reliable in practice.

Figure 5:
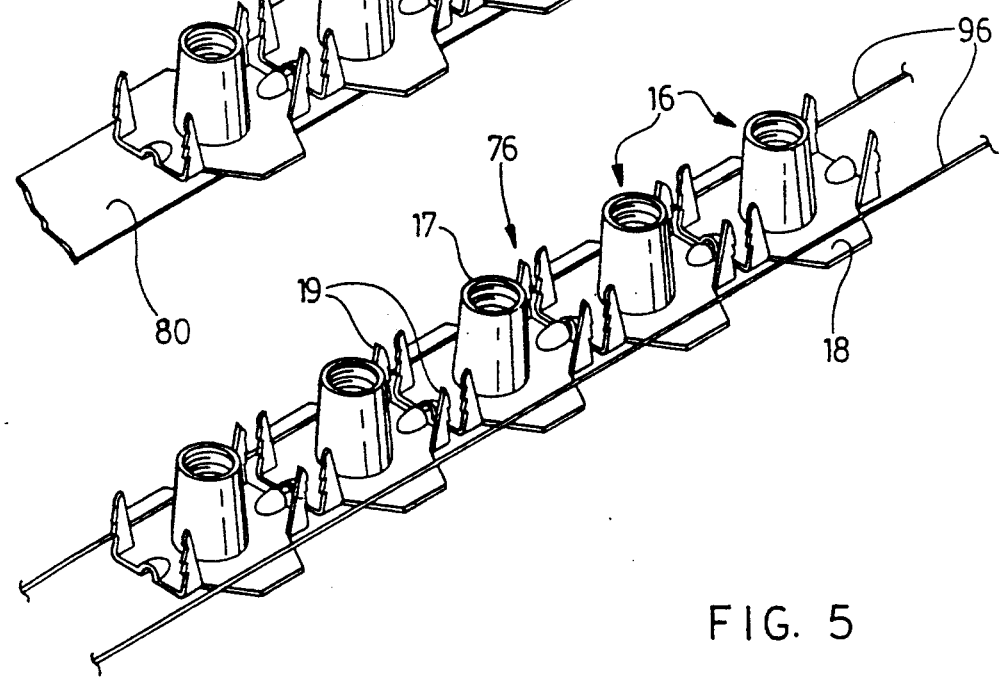
FIG. 5 is a perspective illustration of a strip of fasteners, in accordance with another embodiment of the invention.

Alternatively, the fastening strip may be formed as shown in FIG. 5. In this embodiment, the fasteners 16 are formed into a strip by being welded to two parallel wires 96—96. This form of fastening strip, while being somewhat more costly to manufacture, may be desirable, in some circumstances, where it is required to provide a more secure form of connection between the fasteners.

In either case such strips of fasteners would normally be packaged as in coils C indicated as 98 in FIG. 8, with fastening means or wrapping 100 securing the coil for handling. A backsheet of cardboard 102 would normally be secured to one side, to facilitate handling and packing in packing cases. Typically the coil defines a central opening, and backsheet 102 would have a similar opening with the wrapping 100 would enclose them as shown.

Figure 9:
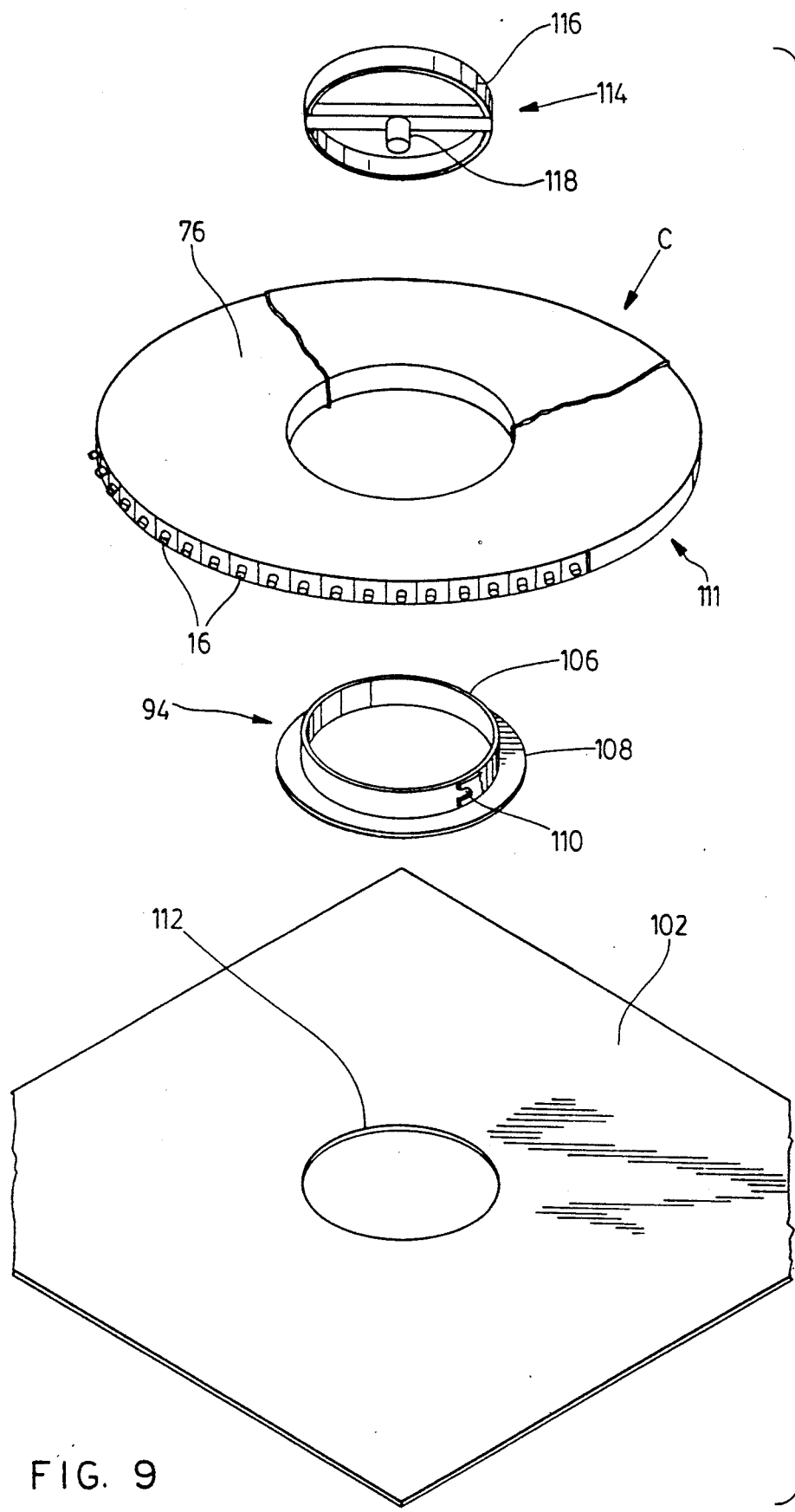
FIG. 9 is an exploded perspective illustration of a package of coiled fasteners.
Figure 11:
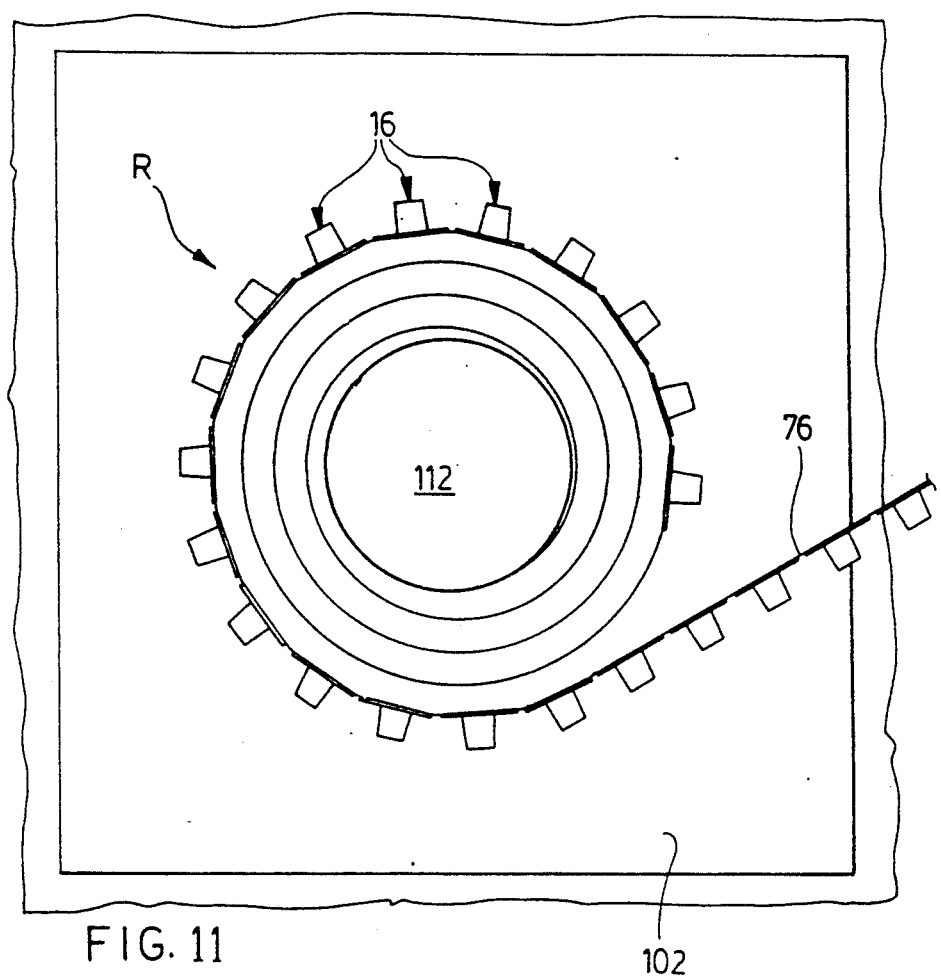
FIG. 11 is a top plan view of an alternate form of a coil of fasteners, and its supporting package, shown on the feed table, which is partially cut away, and, FIG. 12 is a schematic perspective of a further alternate embodiment of a coil of fasteners.

Such a fastener package is shown in more detail in FIG. 9. It will be seen in this illustration, to comprise a coil 98 formed of a strip of Tee nuts indicated generally as 16. The coil 98 in this case may be formed around a core typically of cardboard, indicated generally as 94, comprising a central collar member 106 and an annular flange 108. An abutment or notch 110 may be formed on collar 106. The purpose of this would be to assist in locating the first of the Tee nuts in the coil, and hold it on the collar 106, while the remaining strip of Tee nuts is coiled thereon.

A cardboard or other base panel 102, in this case being shown of a rectangular shape, supports both the collar 104 and the coil 98. A central register opening 112 is formed in panel 102.

The package consisting of the coil 98, the collar 104 and the base 102a may be secured for example by shrink-wrapped plastic such as 100 (FIG. 8) or any other suitable means. Tape 111 secures the outer free end of the strip.

In use, a registering boss 114 is provided, with the fastener setting apparatus. The registering boss 114 comprises an annular ring portion 116 and a central register pin 118.

It is sized so as to fit within the interior of collar 106 of core 104. The pin 118 is intended to be received in a suitable recess 120, formed in column 62 (FIG. 1).

In this way, the entire package of Tee nuts may simply be placed in position on the table, and any wrapping or securing means or the like removed.

The registering boss 114 is then positioned, with the pin 118 in the recess 120.

Figure 2:
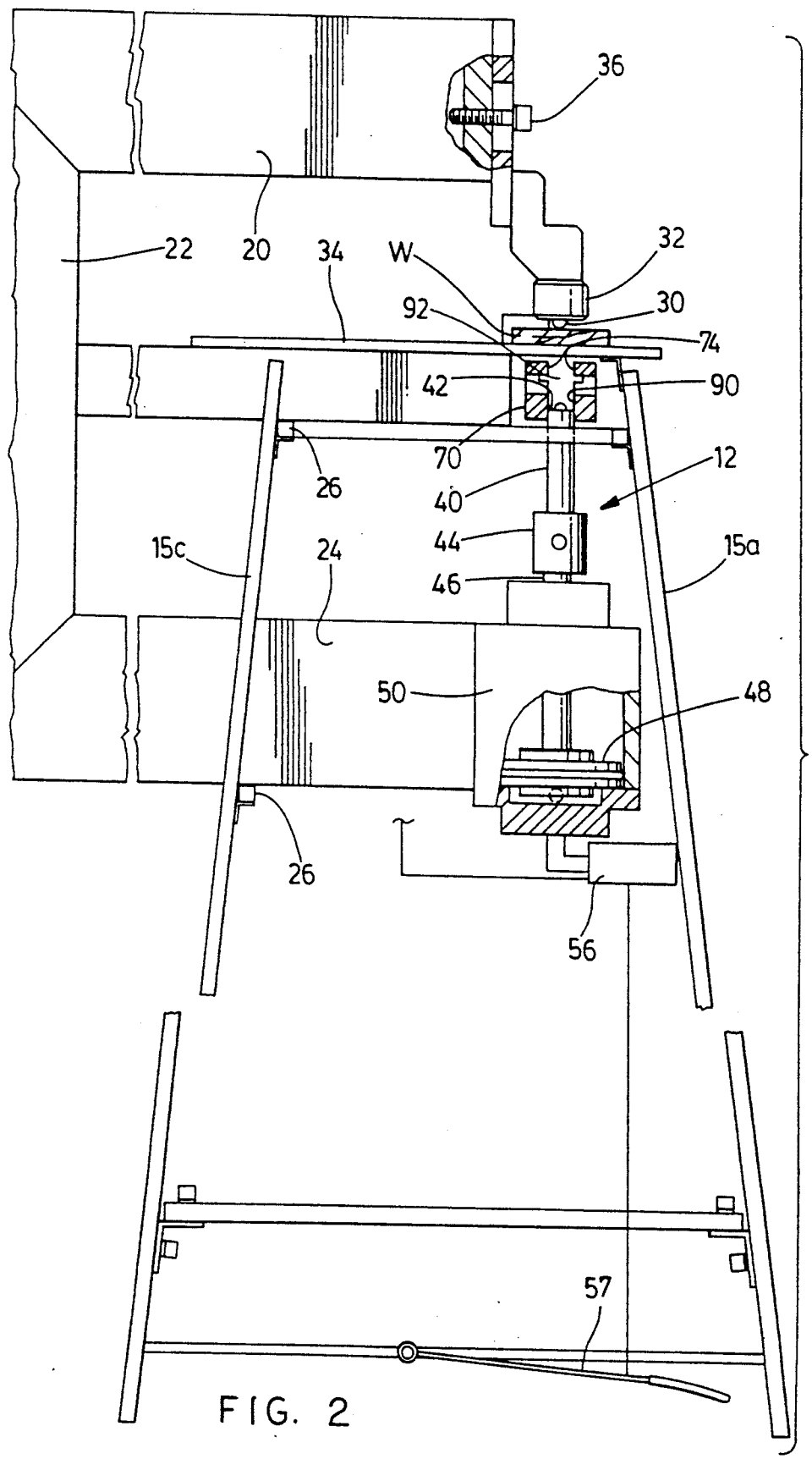
FIG. 2 is a side elevation of the operative portion of the apparatus partially cut away.

The outer end of the strip of Tee nuts from the coil 98 may then be unwound and threaded as shown in FIGS. 1 and 2, and will simply progressively uncoil, with the table rotating in the manner described above.

Figure 10:
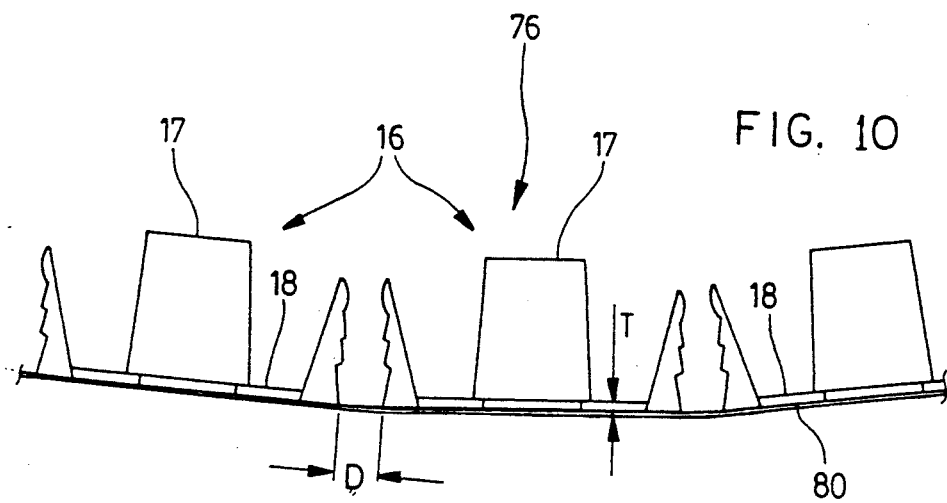
FIG. 10 is a side elevational view of a portion of a strip of fasteners, showing certain arcuate and dimensional relationships.

It will of course be appreciated that the tee nut strip itself may be formed into a coil in two ways. Either the sleeve portions 17 may extend outwardly with respect to the coil (FIG. 3) or they may extend inwardly with respect to the coil (FIGS. 9 and 10).

In either case, it is considered desirable to provide a certain spacing between the individual tee nuts in the strip. The purpose is to ensure a clean separation between the endmost tee nut and the next adjacent tee nut in the strip. This is best illustrated with respect to FIG. 10. In FIG. 10, a strip of tee nuts indicated generally as 76, is shown having a backing strip 80 secured to the flanges of 18 of the tee nut 16 in the manner illustrated in FIG. 4. The flanges 18 are shown spaced apart from one another by a distance S. Typically, the thickness of the flanges 18 will have a thickness T. Preferably, the spacing S will be in the region from 0.2 T to 0.4 T.

Figure 12:
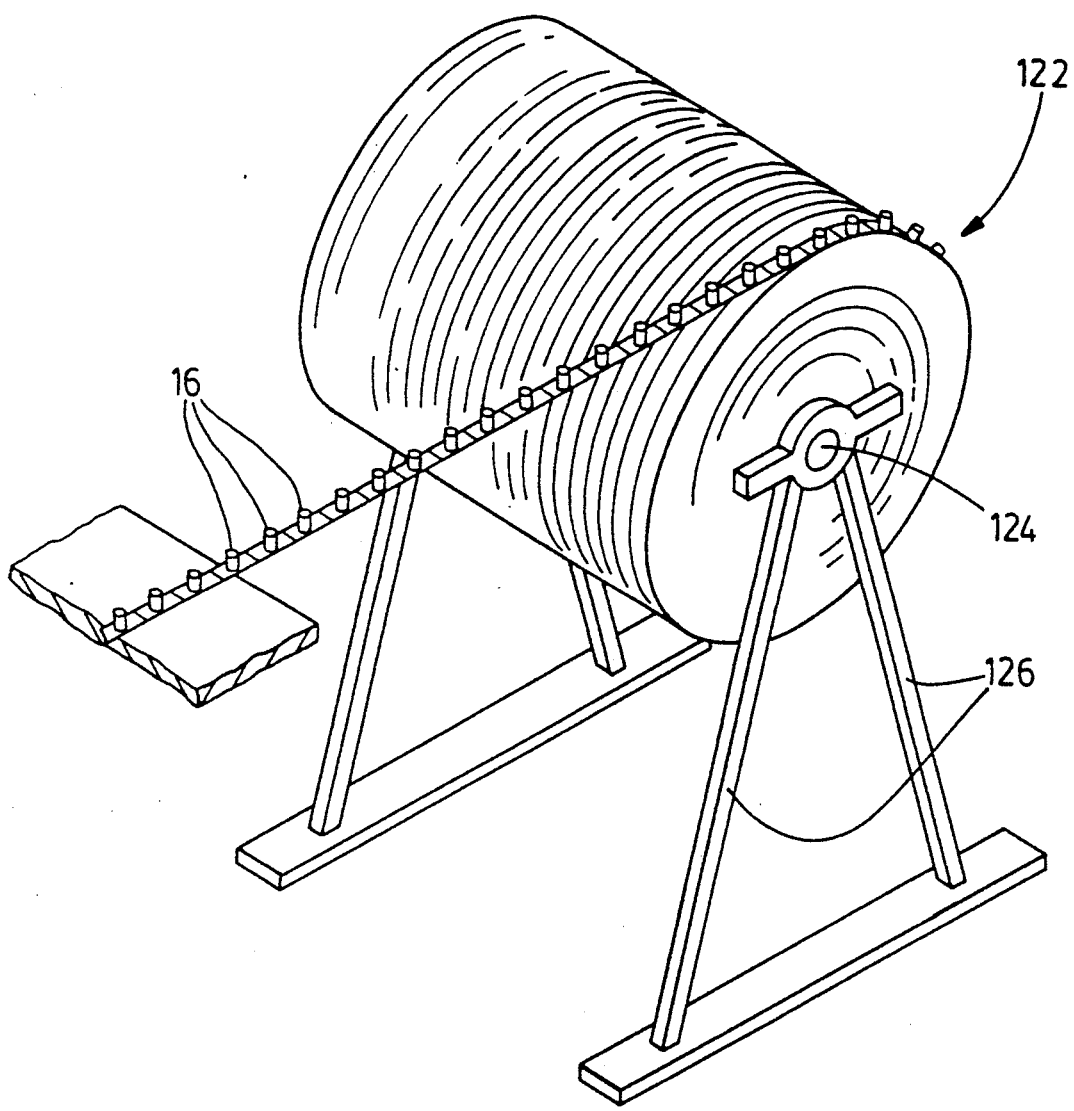

In accordance with a further embodiment illustrated in FIG. 12, the strip of T-nut fasteners 16 may be coiled on a drum. Such a drum is indicated generally as 122. It is of cylindrical shape and may be formed of sheet metal, plastic, or paper board material. It is mounted on a generally horizontal shaft 124 supported on legs 126. Either the shaft 124 can rotate on legs 126 or drum 122 can rotate on shaft 124. In this case the strip of fasteners 16 will unravel from the drum with the fasteners already oriented with their sleeves 17 directed upwardly and can be received directly in guide 72.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. Apparatus for setting Tee-nut fasteners in a workpiece, said workpiece having holes formed therethrough for receiving said Tee-nut fasteners, each said Tee-nut fastener including a sleeve portion adapted to be embedded in said work piece and an integral face flange extending from said sleeve portion substantially normal thereto and adapted to lie on a surface of said work piece, said face flange defining edges, and flexible junction means secured to individual said Tee-nut fasteners whereby to join the same in spaced apart relation and form a continuous strip of Tee-nuts on said junction means and said strip being wound into a coil, which may be progressively unwound, and said apparatus comprising;

register means for engaging a said workpiece on an upper side thereof at a said hole whereby to locate said workpiece in a predetermined location;

driver means located beneath and in registration with said register means and operable to reciprocate upwardly towards said workpiece and downwardly away from said workpiece;

a horizontal rotary support table for supporting said coiled strip of Tee-nut fasteners, said Tee-nut fasteners being adapted to lie with edges of said Tee-nut fasteners contacting said table, and with said sleeve portions extending substantially in a horizontal plane spaced above said table;

bearing means for rotatably mounting said support table, for rotation about a vertical axis;

feed guide channel means secured to said apparatus, and overlying said table to receive said strip of fasteners from said table, said feed guide channel, defining a channel opening directed in a substantially vertical plane, whereby to support said strip of Tee-nut fasteners therein in a position where their sleeve portions are directed substantially vertically upwardly, end, incremental feed movement means operable to progressively unwind said strip of fasteners and to deliver said fastener strip along said feed guide channel and to supply the endmost fastener in said strip, one at a time, to said driver means whereby operation of said driver means will separate said endmost fastener from said strip and will drive said endmost fastener upwardly into said workpiece.

2. Apparatus as claimed in claim 1 wherein said register means includes stop means for engaging said workpiece and securing same against movement in response to movement of said driver means.

3. Apparatus as claimed in claim 1 and wherein said feed guide channel means includes a delivery end adjacent said driver means, and further defines shoulders, defining an upwardly open narrow slot, of reduced width relative to said channel, and wherein said shoulders terminate short of said delivery end, whereby said endmost Tee-nut fastener is free of said shoulders, and can then be driven upwardly from said feed guide channel means by said driver means.

4. Apparatus for setting Tee-nut fasteners as claimed in claim 3, and wherein said feed guide channel means includes a smooth continuous slide portion extending into said delivery end, whereby said fasteners in said strip can be fed smoothly therein without interruption.

* * * * *